(12) United States Patent
Tanaka et al.

(10) Patent No.: US 7,358,210 B2
(45) Date of Patent: *Apr. 15, 2008

(54) CERAMIC BODY AND CERAMIC CATALYST BODY

(75) Inventors: Masakazu Tanaka, Okazaki (JP); Tomomi Hase, Kariya (JP); Takashi Kondo, Kariya (JP); Tosiharu Kondo, Toyoake (JP); Hiromi Sano, Nagoya (JP); Jun Hasegawa, Hekinan (JP); Miho Ito, Aichi-pref. (JP); Tomohiko Nakanishi, Nishio (JP); Kazuhiko Koike, Nishio (JP); Takumi Suzawa, Okazaki (JP)

(73) Assignees: Denso Corporation, Kariya, Aichi-Pref. (JP); Nippon Soken, Inc., Nishio-Shi, Aichi (JP)

( * ) Notice: Subject to any disclaimer, the term of this patent is extended or adjusted under 35 U.S.C. 154(b) by 128 days.

This patent is subject to a terminal disclaimer.

(21) Appl. No.: 10/103,568

(22) Filed: Mar. 22, 2002

(65) Prior Publication Data

US 2003/0045422 A1 Mar. 6, 2003

(30) Foreign Application Priority Data

Mar. 22, 2001 (JP) ............................. 2001-082751
Feb. 25, 2002 (JP) ............................. 2002-047946

(51) Int. Cl.
B01J 21/00 (2006.01)
(52) U.S. Cl. ...................................... 502/251; 502/263
(58) Field of Classification Search ................ 502/242, 502/254, 262, 263, 304, 305, 308, 323, 325, 502/332, 334, 251
See application file for complete search history.

(56) References Cited

U.S. PATENT DOCUMENTS

| | | |
|---|---|---|
| 3,885,977 A | 5/1975 | Lachman et al. |
| 3,956,186 A | 5/1976 | Iwase et al. |
| 4,189,405 A | 2/1980 | Knapton et al. |
| 4,194,917 A | 3/1980 | Sakemi et al. |
| 4,313,853 A | 2/1982 | Sherwood et al. |
| 4,347,063 A | 8/1982 | Sherwood et al. |
| 4,414,256 A | 11/1983 | Sherwood et al. |
| 4,474,731 A | 10/1984 | Brownlow et al. |
| 4,495,300 A | 1/1985 | Sano |
| 4,526,873 A | 7/1985 | Beall et al. |
| 4,587,067 A | 5/1986 | Agrawal et al. |
| 4,654,319 A | 3/1987 | Kim et al. |
| 4,722,916 A | 2/1988 | Watanabe et al. |
| 4,772,580 A | 9/1988 | Hamanaka et al. |
| 4,849,275 A | 7/1989 | Hamaguchi et al. |
| 4,869,944 A | 9/1989 | Harada et al. |
| 4,877,670 A | 10/1989 | Hamanaka |
| 4,956,329 A | 9/1990 | Chao et al. |
| 4,958,216 A | 9/1990 | Tanaka et al. |
| 5,006,221 A * | 4/1991 | Uchikawa et al. ......... 204/426 |
| 5,075,276 A | 12/1991 | Ozawa et al. |
| 5,275,771 A | 1/1994 | Bush et al. |
| 5,334,570 A * | 8/1994 | Beauseigneur et al. ..... 502/304 |
| 5,346,722 A | 9/1994 | Beauseigneur et al. |
| 5,370,920 A | 12/1994 | Forsythe et al. |
| 5,489,865 A | 2/1996 | Colvin, Sr. |
| 5,529,732 A | 6/1996 | Ideguchi et al. |
| 5,552,349 A | 9/1996 | Ichii et al. |
| 5,567,663 A | 10/1996 | Kotani et al. |
| 5,607,885 A | 3/1997 | Ichii et al. |
| 5,688,740 A | 11/1997 | Bolshakov et al. |
| 5,716,899 A | 2/1998 | Guile et al. |
| 5,773,103 A | 6/1998 | Ciora, Jr. et al. |
| 5,935,897 A | 8/1999 | Trubenbach et al. |
| 6,027,684 A | 2/2000 | Gheorghiu et al. |
| 6,099,793 A | 8/2000 | Dull et al. |
| 6,171,573 B1 | 1/2001 | Sato |
| 6,194,650 B1 | 2/2001 | Wakayama et al. |
| 2002/0039966 A1* | 4/2002 | Tanaka et al. |
| 2002/0042344 A1* | 4/2002 | Kondo et al. |
| 2002/0045541 A1* | 4/2002 | Koike et al. |
| 2002/0077248 A1* | 6/2002 | Nakanishi et al. |
| 2003/0007905 A1* | 1/2003 | Tanaka et al. |
| 2003/0022788 A1* | 1/2003 | Tanaka et al. |
| 2003/0083192 A1* | 5/2003 | Suzawa et al. |
| 2003/0086835 A1* | 5/2003 | Suzawa et al. |
| 2003/0092567 A1* | 5/2003 | Tanaka et al. |
| 2003/0092569 A1* | 5/2003 | Koike et al. |
| 2003/0100446 A1* | 5/2003 | Hase et al. |
| 2003/0109383 A1* | 6/2003 | Koike et al. |
| 2003/0158035 A1* | 8/2003 | Ito et al. |
| 2003/0171217 A1* | 9/2003 | Koike et al. |

FOREIGN PATENT DOCUMENTS

DE 198 49 340 A1 4/1999

(Continued)

OTHER PUBLICATIONS

Translation of Japan 62-004441, Jan. 1987.*
Database WPI, Section Ch, Week 198103, Derwent Publications Ltd., London, GB; AN 1981-02875D, XP002207286 & JP 55 144468 A (NGK Insulators Ltd), Nov. 11, 1980.

(Continued)

Primary Examiner—Steven Bos
(74) Attorney, Agent, or Firm—Nixon & Vanderhye P.C.

(57) ABSTRACT

A ceramic body that can support a required amount of catalyst component, without lowering the characteristics such as strength, manufactured without forming a coating layer and providing a high performance ceramic catalyst body that is excellent in practical utility and durability. This ceramic body is made by substituting at least one of the constituent elements of cordierite that constitutes the substrate ceramic, for example Al, with W that is the element having an empty orbit in d or f orbit, has high bonding strength and is less susceptible to deterioration since the catalyst component Pt is supported by means of chemical bonding.

41 Claims, 11 Drawing Sheets

FOREIGN PATENT DOCUMENTS

| | | |
|---|---|---|
| DE | 19745548 A1 | 4/1999 |
| DE | 199 08 173 A1 | 9/1999 |
| EP | 0597045 A1 | 5/1994 |
| EP | 0 671 369 A2 | 9/1995 |
| EP | 1 029 836 A2 | 8/2000 |
| EP | 1 043 067 A2 | 10/2000 |
| EP | 1043067 * | 10/2000 |
| EP | 1 029 836 A3 | 2/2001 |
| EP | 001243329 A1 * | 9/2002 |
| JP | S50-75611 A | 6/1975 |
| JP | 51-37908 | 3/1976 |
| JP | S54-100409 A | 8/1979 |
| JP | 55-144468 | 11/1980 |
| JP | 56-150435 | 11/1981 |
| JP | 57-078946 | 5/1982 |
| JP | 58-30337 | 2/1983 |
| JP | 58-79869 | 5/1983 |
| JP | 58-183948 | 10/1983 |
| JP | 59-062324 | 4/1984 |
| JP | S59-142849 A | 8/1984 |
| JP | B-60-7537 | 2/1985 |
| JP | B-60-41022 | 9/1985 |
| JP | 61-178038 | 8/1986 |
| JP | 61-234937 | 10/1986 |
| JP | 61-261260 | 11/1986 |
| JP | S61-261259 A | 11/1986 |
| JP | S61-261260 A | 11/1986 |
| JP | 62-004441 | 1/1987 |
| JP | S62-027041 A | 2/1987 |
| JP | 63-248442 | 10/1988 |
| JP | S64-3067 A | 1/1989 |
| JP | 207842 A | 8/1990 |
| JP | 03-178335 | 8/1991 |
| JP | 04-059049 | 2/1992 |
| JP | H04-227846 A | 8/1992 |
| JP | B-4-70053 | 11/1992 |
| JP | 5-50338 | 7/1993 |
| JP | H06-114272 A | 4/1994 |
| JP | 7-133713 | 5/1995 |
| JP | 07-196363 | 8/1995 |
| JP | 7-242465 | 9/1995 |
| JP | H07-242465 A | 9/1995 |
| JP | A-7-101772 | 4/1996 |
| JP | 08-257407 | 10/1996 |
| JP | 09-117674 | 5/1997 |
| JP | A-9-155189 | 6/1997 |
| JP | A-9-158710 | 6/1997 |
| JP | 2000-15112 A | 1/2000 |
| JP | 2000-17442 A | 1/2000 |
| JP | 2001-519310 A | 10/2001 |
| JP | 2001-310128 * | 11/2001 |
| JP | 2002-028490 | 1/2002 |
| JP | 2002-066337 | 3/2002 |
| JP | 2002-119809 | 4/2002 |
| JP | 2002-513670 | 5/2002 |
| WO | WO 99/18047 | 4/1999 |
| WO | WO 99/28269 | 6/1999 |
| WO | WO 00/40521 | 7/2000 |
| WO | WO 00/76939 A1 | 12/2000 |

OTHER PUBLICATIONS

Database WPI, Section Ch, Week 199331, Derwent Publications Ltd., London, GB; AN 1993-247703, XP002207287 & JP 05 168860 A (Toyota Jidosha KK), Jul. 2, 1993.

Iwanami's Dictionary of Physics and Chemistry, 4$^{th}$ Edition, Oct. 12, 1987, p. 420.

Ceramics 17 (1982) No. 1, 1982, pp. 25 to 29.

Journal of the Materials Science Society of Japan, 10 (1973) 214-220.

Evaluation Methods for Ceramics, Mar. 31, 1993, p. 26.

Nippon Ceramic Association, "Ceramics Engineering Handbook," Gihodo Shuppan K.K., (Apr. 10, 1989), pp. 33-36 (partial translation enclosed).

Fine Ceramics Dictionary Edition Committee, "Fine Ceramics Dictionary," Gihodo Shuppan K.K. (1987), p. 183 (partial translation enclosed).

Japanese Application No. 2000-104994 (corresponding to U.S. Appl. No. 09/546,227), Official Action mailed Jun. 20, 2006 (translation enclosed).

* cited by examiner

QUANTITY OF CATALYST SUPPORTED (g/l)

CATALYST LENGTH

INCLUDING STEP-WISE SUPPORTING (TWO OR MORE STEPS)

QUANTITY OF CATALYST SUPPORTED (g/l)

CATALYST LENGTH

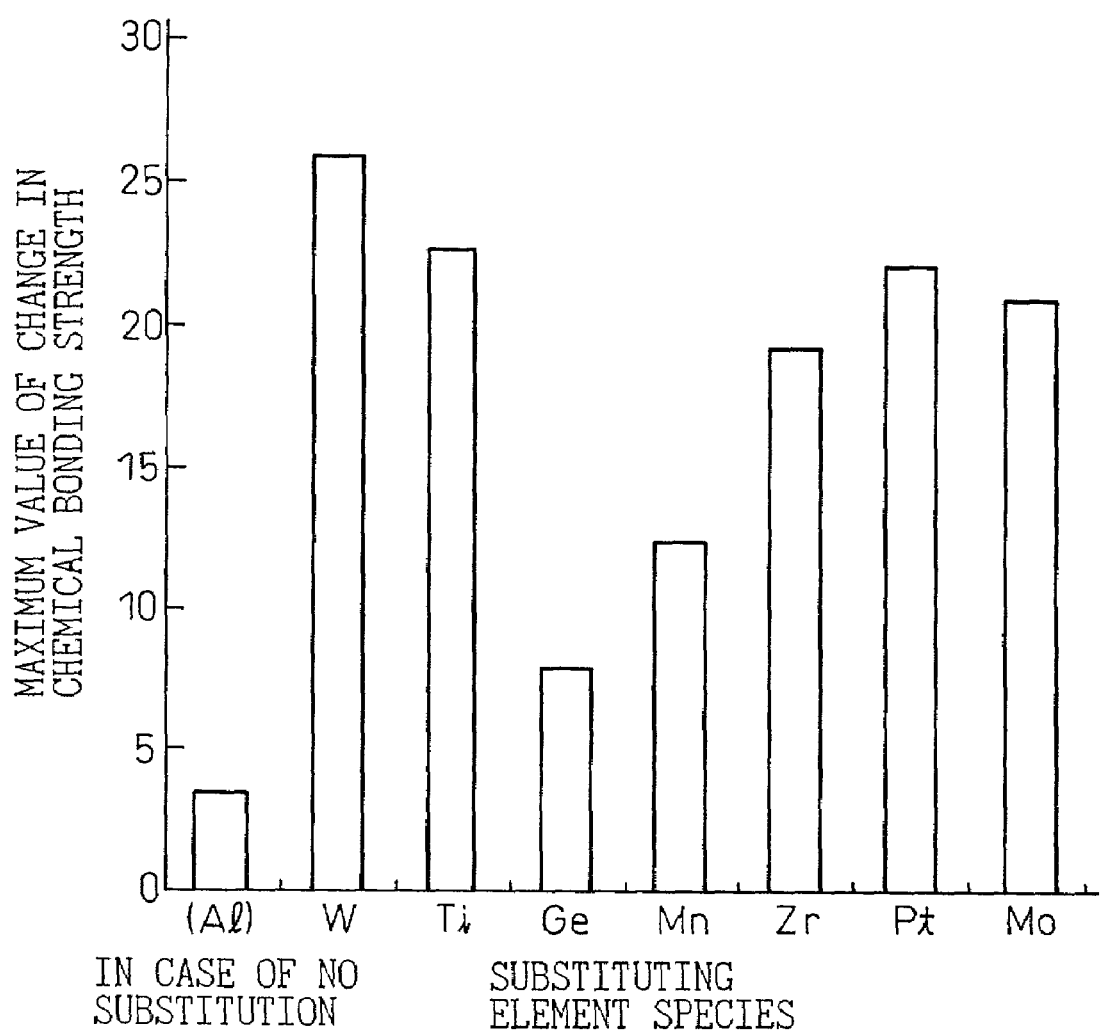

(EXAMPLE: SUBSTITUTED WITH W+Ti)

CERAMIC BODY AND CERAMIC CATALYST BODY

BACKGROUND OF THE INVENTION

1. Field of the Invention

The present invention relates to a ceramic body and a ceramic catalyst body used as a catalyst support in an exhaust gas purifying catalyst of an automobile engine, or the like.

2. Description of the Related Art

Cordierite that has high durability against thermal shock has been widely used as a ceramic body for a catalyst support. The catalyst is made by applying a γ-alumina coating on the surface of cordierite that is formed in honeycomb shape, and providing it with a noble metal catalyst supported thereon. The coating layer is formed because the specific surface area of the cordierite is too small to support a required amount of catalyst component. Thus surface area of the support is increased by using γ-alumina that has a large specific surface area.

When the surface of the support is coated with γ-alumina, however, the heat capacity of the carrier increases due to the increase in the mass. Recently, investigations have been conducted for means to make the heat capacity smaller by making the cell wall of the honeycomb support thinner, in order to achieve earlier activation of the catalyst. However, the effect of this attempt is reduced by the formation of the coating layer. There have also been such problems that the coefficient of thermal expansion of the support becomes larger due to the coating layer, and the decrease in the opening area of the cell increases the pressure loss.

Various researches have been conducted to achieve ceramic bodies capable of supporting catalyst components without forming a coating layer. In Japanese Examined Patent Publication (Kokoku) No. 5-50338, for example, such a method is proposed that improves the specific surface area of cordierite itself by applying heat treatment after pickling. However, this method has not been practical because a pickling process or a heat treatment causes the destruction of the crystal lattice of cordierite, thus resulting in lower mechanical strength.

SUMMARY OF THE INVENTION

An object of the present invention is to solve the problems of the prior art, and provide a ceramic body capable of supporting, without forming a coating layer, a required amount of catalyst component without lowering the characteristics such as strength, thereby to provide a high performance ceramic catalyst body that is excellent in utility and durability.

A ceramic body according to the present invention comprises a substrate ceramic wherein one or more of elements that constitute it is substituted with an element other than the constituent elements, and a catalyst component can be directly supported on the substituting element.

As the ceramic body of the present invention comprises the substrate ceramic of which part of the constituent elements is substituted and the catalyst component is directly supported on the substituting element, such a problem does not occur as the crystal lattice is destroyed leading to lower strength, unlike the prior art technology that increases the specific surface area of the substrate ceramic by eluting the constituent element by pickling or other process. As a result, the ceramic body can directly support the catalyst component while maintaining a sufficient strength, and is excellent in practical utility and durability.

According to one aspect of the present invention, the catalyst component is supported on the substituting element by means of chemical bonding. As the catalyst component is supported by means of chemical bonding, the catalyst holding power becomes higher than the common supporting structure that holds the metal catalyst particles in pores. The capability to distribute the catalyst component uniformly over the support makes the catalyst less likely to coagulate, thus resulting in less deterioration after a long period of use.

Preferably, the substrate ceramic is made of a ceramic material that contains cordierite in a concentration not lower than 1 vol %, preferably not lower than 5 vol %. Cordierite has high resistance against thermal shock and is preferably used as the catalyst for purifying, for example, automotive exhaust gas. The constituent element to be substituted may be, for example, one or more kinds among Si, Al and Mg.

The ratio of effective ion diameter of the constituent element (Si, Al, Mg) to be substituted to that of the substituting element is preferably in a range from 0.7 to 2.0, which makes it easier to substitute the element.

According to one aspect of the present invention, elements having d or f orbits in the electron orbits thereof are used as the substituting elements, and the effect described above can be achieved by selecting one or more from among these elements.

It is more preferable that the substituting element has an empty orbit in the d or f orbits thereof. Specifically, the substituting element is at least one kind selected from among a group consisting of Ti, V, Cr, Mn, Fe, Co, Ni, Zr, Mo, Ru, Rh, Ce, W, Ir and Pt. These elements have energy level near to that of the catalyst component, and is apt to impart electrons.

Alternatively, the substituting element may be one or more kinds of element that has two or more stable oxidation states. The substituting element may be at least one kind selected from among a group consisting of Cu, Ga, Ge, Se, Pd, Ag and Au, which can achieve an effect similar to that described above.

Preferably, the proportion of solid solution of the substituting element required for supporting the catalyst component is not lower than 5 ppb of the number of atoms of the constituent element to be substituted. As a smaller catalyst particle size leads to a larger number of catalyst particles for a given quantity of catalyst supported, the proportion of solid solution of the substituting element is more preferably not lower than 5 ppm of the number of atoms of the constituent element to be substituted. Furthermore, the proportion of solid solution of the substituting element is more preferably in a range from 0.01% to 50% of the number of atoms of the constituent element to be substituted. When the proportion of solid solution is in this range, the effect described above can be achieved without affecting the crystal structure.

For example, the optimum value is obtained when the proportion of the solid solution is in a range from 2 to 7% of the number of atoms of the constituent element to be substituted in the substrate ceramic containing cordierite as a main component, the proportion is in a range from 5 to 15% of the number of atoms of the constituent element to be substituted in the substrate ceramic containing titania as a main component, and the proportion is in a range from 1 to 5% of the number of atoms of the constituent element to be substituted in the substrate ceramic containing alumina as a main component.

The catalyst component preferably contains element of at least one kind selected from among a group consisting of Pt, Rh, Pd, Ir, Au, Ag, Ru, Hf, Ti, Cu, Ni, Fe, Co, W, Mn, Cr, V, Se, Rb, Sr, Y, Zr, Nb, Mo, Tc, Ru, Sc, Ba, K and lanthanoid elements as the main catalyst or promoter, and oxides thereof, according to the purposes. Preferably Pt, Rh, Pd and Ir as the main catalyst and at least one element selected from Y, Zr, La and Ce or oxides thereof as the promoter are used as the catalyst component.

According to one aspect of the present invention, the catalyst component can be supported by the fact that an electron orbit thereof overlaps that of the substituting element. Alternatively, the catalyst component can be supported by means of ion bonding with the substituting element, resulting in a high bonding strength and less susceptibility to thermal deterioration because of the chemical bonding.

Preferably, the constituent element and the substituting element are selected so that the sum of oxidation numbers of the constituent element to be substituted is equal to the sum of oxidation numbers of the substituting element. When the sum of oxidation numbers changes after substitution, lattice defects may be generated and lead to thermal deterioration due to the catalyst component supported with low bonding strength at the defects. Such a problem can be mitigated by making the sum of oxidation numbers of the constituent element equal to the sum of oxidation numbers of the substituting element. However, as the substituting elements are mainly transition metals and have a plurality of valence values, a lattice defect is not likely to occur even when making the sum of oxidation numbers of the constituent element different from the sum of oxidation numbers of the substituting element.

Specifically, the sum of oxidation numbers can be made the same before and after substitution, by substituting one of the constituent elements with the substituting element that has the same value of valence as that of the former. Alternatively, the sum of oxidation numbers can easily be made the same before and after substitution, by substituting one of the constituent elements with a plurality of the substituting element that has different values of valence from that of the former and selecting a proper combination of the values of valence.

More specifically, the constituent element is Si, Al or Mg, and the constituent element can be substituted with two kinds of the substituting elements. Then the effect described above can be achieved by including the two kinds of said elements in proportion of 1:1 in the ratio of the number of atoms, and making the total number of atoms of the two kinds of elements equal to the number of atoms of the constituent elements to be substituted.

At this time, both the constituent elements to be substituted with the two kinds of element can be located at the Si site. In addition, such arrangements can be employed as one of the constituent elements to be substituted with the two kinds of the substituting element is located at the Si site and the other is located at the Al site, one of the constituent elements to be substituted with the two kinds of the substituting element is located at the Si site and the other is located at the Mg site, both the constituent elements to be substituted with the two kinds of the substituting element are located at the Al site, one of the constituent elements to be substituted with the two kinds of the substituting element is located at the Al site and the other is located at the Mg site, or both the constituent elements to be substituted with the two kinds of the substituting element are located at the Mg site.

According to one aspect of the present invention, when the constituent element is Si, Al or Mg, the constituent element can be substituted with three kinds of the substituting elements. Then the effect described above can be achieved by selecting two of the thee kinds of elements having the same value of valence, including the two kinds of the elements that have the same value of valence and the other one kind of element in the proportion of 2:1 in the ratio of the number of atoms, and making the total number of atoms of the three kinds of elements equal to the number of atoms of the constituent elements to be substituted.

According to another aspect of the present invention, such a constitution may also be employed as the constituent element is Si, Al or Mg, the constituent element is substituted with three kinds of the substituting elements, while selecting the three kinds of elements that have different values of valence, including the three kinds of the elements in the proportion of 1:1:1 in the ratio of the number of atoms, and making the total number of atoms of the three kinds of elements equal to the number of atoms of said constituent elements to be substituted.

Furthermore, such a constitution may be employed as the constituent element is Si, Al or Mg, the constituent element is substituted with three kinds of the substituting elements, while selecting the three kinds of elements so that at least one thereof has the same values of valence as that of the constituent element, including the three kinds of the elements in the proportion of 1:1:1 in the ratio of the number of atoms, and making the total number of atoms of the three kinds of elements equal to the number of atoms of said constituent elements to be substituted.

According to another aspect of the present invention, such a constitution may also be employed as the constituent element is Si, Al or Mg, and the constituent element is substituted with four kinds of the substituting elements. Then the effect described above can be achieved by selecting such elements for two of the four kinds of elements that have the same value of valence and such elements for the other two kinds of elements that have the same value of valence, with the pairs each comprising the two kinds of elements that have the same value of valence being included in the proportion of 1:1 in the ratio of the number of atoms, and the total number of atoms of the four kinds of elements being equal to the number of atoms of said constituent elements to be substituted.

According to one aspect of the present invention, such a constitution may also be employed as the constituent element is Si, Al or Mg, while the constituent element is substituted with four kinds of the substituting elements, with two of the four kinds of elements having the same value of valence, the two kinds of elements that have the same value of valence and the remaining two kinds of elements being included in the proportion of 2:1:1 in the ratio of the number of atoms, and the total number of atoms of the four kinds of elements being equal to the number of atoms of said constituent elements to be substituted.

Furthermore, such a constitution may also be employed as the constituent element is Si, Al or Mg, while the constituent element is substituted with four kinds of the substituting elements, with two of the four kinds of elements having the same value of valence as that of said constituent elements, the two kinds of elements that have the same value of valence and the remaining two kinds of elements being included in the proportion of 2:1:1 in the ratio of the number of atoms, and the total number of atoms of the four kinds of elements being equal to the number of atoms of the constituent elements to be substituted.

According to another aspect of the present invention, such a constitution may also be employed as the constituent element is Si, Al or Mg, while the constituent element is substituted with four kinds of the substituting elements, with three of the four kinds of elements having the same value of valence, the three kinds of elements that have the same value of valence and the remaining one kind of element being included in the proportion of 3:1 in the ratio of the number of atoms, and the total number of atoms of the four kinds of elements being equal to the number of atoms of said constituent elements to be substituted.

Furthermore, such a constitution may also be employed as the constituent element is Si, Al or Mg, while the constituent element is substituted with four kinds of the substituting elements, with the four kinds of said elements being included in the proportion of 1:1:1:1 in the ratio of the number of atoms, and the total number of atoms of the four kinds of elements being equal to the number of atoms of said constituent elements to be substituted.

According to one aspect of the present invention, such a constitution may also be employed as the constituent element is Si, Al or Mg, while the constituent element is substituted with four kinds of the substituting elements, with at least one of the four kinds of elements having the same value of valence as that of the constituent element, the four kinds of elements being included in the proportion of 1:1:1:1 in the ratio of the number of atoms, and the total number of atoms of the four kinds of elements being equal to the number of atoms of said constituent elements to be substituted.

Further according to one aspect of the present invention, such a constitution may also be employed as, when the constituent element is substituted with the substituting element having a different electric charge, the number of lattice defects generated thereby is not larger than 2 per formula weight (2 MgO. 2Al$_2$O$_3$.5SiO$_2$) of cordierite that is the substrate ceramic. This makes it possible to ensure the stability of the crystal and reduce failures due to the defects.

The shape of the ceramic body may be selected from among various shapes such as honeycomb, foamed block, hollow fiber, fiber, powder or pellets.

According to one aspect of the present invention, the ceramic catalyst body can be made by supporting the catalyst component directly on the ceramic body described above. It is possible to make the ceramic catalyst body having high durability capable of early activation of the catalyst that is not subject to increases in the thermal capacity and in the coefficient of thermal expansion due to coating layer, as the ceramic component is supported directly on the substituting element.

According to one aspect of the present invention, when the catalyst component contains a main catalyst and a promoter component, the promoter component can be partially supported on a part of the ceramic body. For example, early activation of the catalyst can be achieved by supporting the promoter component only. When deterioration of the catalyst is checked by monitoring the capacity of the promoter component to absorb and dissociate oxygen, however, addition of a new system for detecting the deterioration of the catalyst becomes necessary. In such a case, both the early activation and detection of catalyst deterioration can be achieved by supporting the promoter component only on a part of the honeycomb ceramic body, for example at the rear end thereof.

In this case, it will be effective to support a relatively large amount of the promoter component, namely 20 g/L or more, in the portion supporting the promoter component.

According to one aspect of the present invention, a wash coating material may also be partially supported on a part of the ceramic body. This makes it possible to absorb and collect HC, that is emitted when the engine is started while it is cold, on the wash coating material.

BRIEF DESCRIPTION OF THE DRAWINGS

FIG. 11 shows the chemical bonding strength of the substituting element with the catalyst component in comparison to a case without substitution.

DESCRIPTION OF THE PREFERRED EMBODIMENTS

The present invention will be described in detail below. The ceramic body according to the present invention comprises a substrate ceramic wherein one or more of elements that constitute it is substituted with an element other than the constituent elements, and a catalyst component can be directly supported on the substituting element. The ceramic catalyst body obtained by directly supporting the catalyst component is suited for use as an automobile exhaust gas purifying catalyst. A substrate ceramic made from cordierite having theoretical composition of 2 MgO.2Al$_2$O$_3$.5SiO$_2$ as the main component is suited for use as a substrate for ceramic. Specifically, ceramic containing cordierite in a concentration not lower than 1 vol %, preferably not lower than 5 vol %, is suitably used. The main component of the ceramic may also be other ceramic materials such as alumina, spinel, aluminum titanate, silicon carbide, mullite, zirconium phosphate, silicon nitride, zeolite, and silica-alumina, in addition to cordierite. The shape of the ceramic carrier is not limited and may also be other shapes such as honeycomb, foam, hollow fiber, fiber, powder or pellets.

As the element substituted with the constituent elements (for example, Si, Al and Mg in the case of cordierite) of the substrate ceramic, elements having a large bonding strength with the catalyst component as compared with those constituent elements and capable of supporting the catalyst component by means of chemical bonding are used. Specifically, the substituting elements may be one or more of elements which are different from the constituent elements and have a d or an f orbit in the electron orbits thereof, and preferably have empty orbit in the d or f orbit or have two or more oxidation states. An element which has empty orbit in the d or f orbit has energy level near that of the noble metal catalyst being supported, which means a higher tendency to exchange electrons and bond with the catalyst component. An element which has two or more oxidation states also has higher tendency to exchange electrons and provides the same effect.

Specific examples of the substituting element having an empty orbit in the d or f orbit thereof include Sc, Ti, V, Cr, Mn, Fe, Co, Ni, Y, Zr, Nb, Mo, Tc, Ru, Rh, La, Ce, Pr, Nd, Pm, Sm, Eu, Gd, Tb, Dy, Ho, Er, Tm, Lu, Hf, Ta, W, Re, Os, Ir and Pt. Preferably, one or more of elements selected from Ti, V, Cr, Mn, Fe, Co, Ni, Zr, Mo, Ru, Rh, Ce, W, Ir and Pt are used. Among these elements, Ti, V, Cr, Mn, Fe, Co, Ni, Nb, Mo, Tc, Ru, Rh, Ce, Pr, Eu, Tb, Ta, W, Re, Os, Ir and Pt are elements having two or more oxidation states.

Specific examples of the other element having two or more oxidation states include Cu, Ga, Ge, As, Se, Br, Pd, Ag, In, Sn, Sb, Te, I, Yb and Au. Preferably, one or more of elements selected from Cu, Ga, Ge, Se, Pd, Ag and Au are used.

Figure 1A:
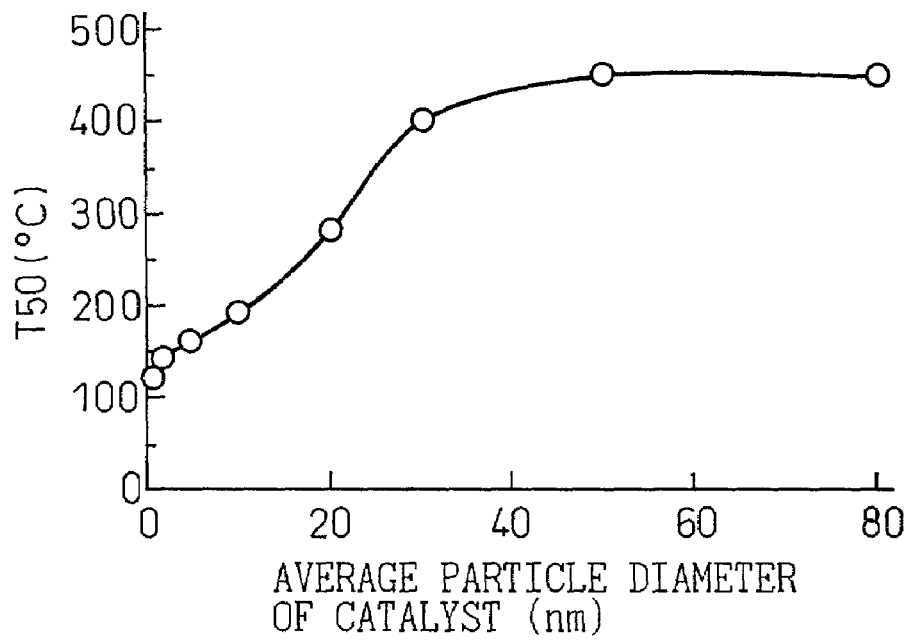
FIG. 1 (a) shows the 50% purification performance as a function of the mean particle size of the catalyst, and FIG. 1 (b) shows the 50% purification performance as a function of the quantity of the catalyst supported.
Figure 1B:
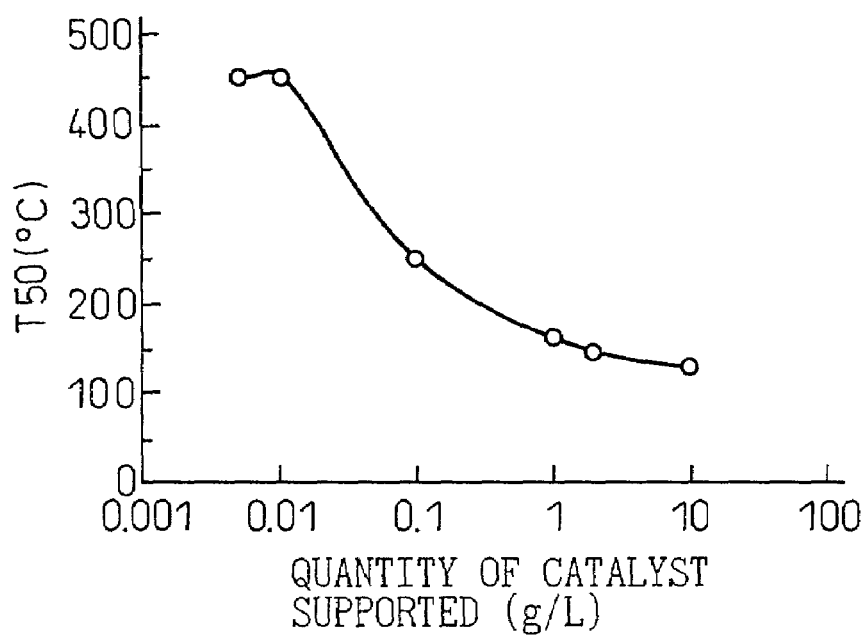
Figure 2:
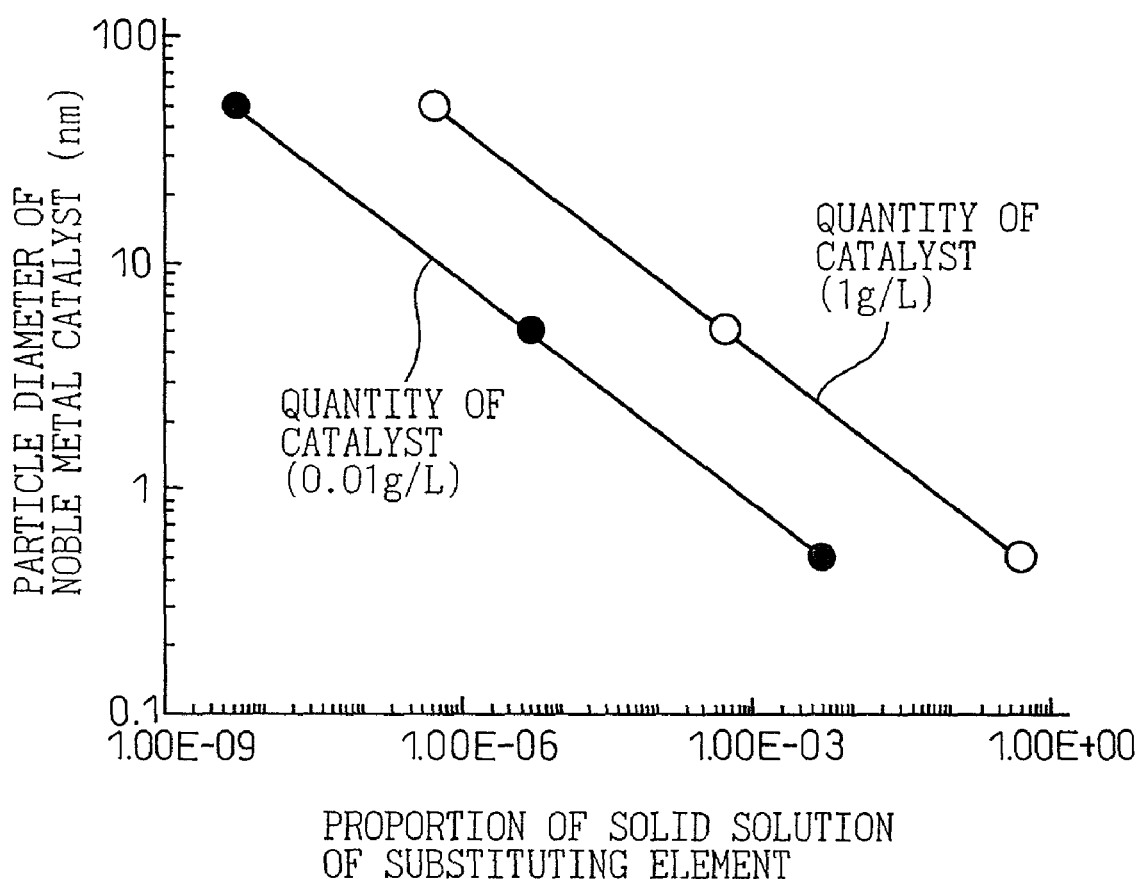
FIG. 2 shows the relation between the proportion of solid solution of substituting element and of the particle size of the noble metal catalyst.

When the constituent element of the substrate ceramic is substituted with these substituting elements, the proportion of solid solution of the substituting element is not lower than 5 ppb, and preferably not lower than 5 ppm, of the number of atoms of the constituent element to be substituted. As shown in FIG. 1 (a), a smaller average particle of the catalyst component to be supported leads to more improved performances of the catalyst (T50:50% purification performance). The average particle size of the catalyst component is usually not higher than 100 nm, and preferably not higher than 50 nm. As shown in FIG. 1 (b), as a quantity of the catalyst supported of not lower than 0.01 g/L is required to exert the catalytic performance when the average particle size is 50 nm, the proportion of solid solution of the substituting element of not lower than 5 ppb ($5 \times 10^{-9}$) is required to control the average particle size of the catalyst component to not higher than 50 nm when the quantity of the catalyst supported is 0.01 g/L, as is apparent from FIG. 2. When the average particle size is not higher than 5 nm, the proportion of solid solution of the substituting element of not lower than 5 ppm ($5 \times 10^{-6}$) is required.

More preferably, the proportion of solid solution of the substituting element is controlled in a range from 0.01 to 50% of the number of atoms of the constituent element to be substituted. When one of constituent elements is substituted with plural substituting elements, the total proportion is controlled within the above range. To obtain a sufficient effect due to the substitution, the proportion is preferably controlled to not lower than 0.01% in view of the detection limit and concentration of inevitable impurities due to an analyzer such as EPMA. The proportion of higher than 50% is not preferred because of an increase in influence on the structure of the substrate ceramic. According to the kind of the substrate ceramic and the substituting element, the optimum value may be obtained by appropriately setting the proportion of the solid solution of the substituting element. For example, the optimum value is obtained when the proportion of the solid solution is in a range from 2 to 7% of the number of atoms of the constituent element to be substituted when the substrate ceramic is cordierite and the substituting elements are W and Ti. For example, the optimum value is obtained when the proportion of W and Al is from 5 to 15% in titania, and the proportion of W and Ti from 1 to 5% in alumina.

The ceramic body wherein a portion of constituent elements of the substrate ceramic is substituted of the present invention is produced, for example, by previously subtracting a portion of starting materials of constituent elements to be substituted according to the proportion to be substituted to prepare starting materials of ceramic, kneading the mixture, forming the kneaded mixture and drying the preform using a conventional method, and immersing in a solution containing substituting elements. The preform having many substituting elements on the surface of the preform was taken out of the solution and dried, followed by degreasing and further sintering in air atmosphere. By employing the method of supporting substituting elements in a dry body in place of kneading with raw ceramic materials, many substituting elements exist on the surface of the preform and substitution with elements arises on the surface of the preform during sintering to easily form a solid solution.

In accordance with the method described above, a ceramic body was prepared by using cordierite as the substrate ceramic and substituting 5 to 20% of Al which is the constituent element with W. Starting materials were prepared by using a cordierite material comprising talc, kaolin and alumina and subtracting 5 to 20% of the Al source from the cordierite material, and were kneaded and formed into honeycomb using a conventional method, and then dried. The dried preform was immersed in a solution of $WO_3$, a compound of W used as the substituting element. The preform have much $WO_3$ on the surface of the honeycomb preform was taken out of the solution and dried. After degreasing at 900° C. in air atmosphere, the honeycomb structure was sintered in air atmosphere at a heating rate of 5 to 75° C./hr and held at a temperature of 1250 to 1390° C.

To produce a ceramic body wherein a portion of constituent elements of the substrate ceramic is substituted, there can also be employed a method of previously subtracting a portion of starting materials of constituent elements to be substituted according to the proportion to be substituted to prepare starting materials of ceramic, adding substituting elements in starting materials of ceramic, kneading them, forming the mixture, drying the preform, and sintering the dry preform.

Cordierite materials comprising talc, kaolin, alumina and aluminum hydroxide, and tungsten oxide ($WO_3$), which is a compound of the substituting element W, having valence of a value different from that of Al substituting 10% of the Al source were mixed in proportions around the theoretical composition of cordierite. Proper quantities of a binder, a lubricant, a humectant and water were added to the mixture and kneaded into a paste. The paste was formed into a honeycomb body having a cell wall thickness of 100 μm, a cell density of 400 cpsi (number of cells per 1 square inch) and diameter of 50 mm. The honeycomb body was sintered in an air atmosphere of 1250 to 1390° C.

Cordierite materials comprising talc, kaolin, alumina and aluminum hydroxide, and plural substituting elements, 10% of tungsten oxide ($WO_3$) and 10% of titanium oxide ($TiO_2$), as compounds of W and Ti, substituting 20% of the Al source were mixed in proportions around the theoretical composition of cordierite. Proper quantities of a binder, a lubricant, a humectant and water were added to the mixture and kneaded into a paste. The paste was formed into a honeycomb structure having a cell wall thickness of 100 μm, a cell density of 400 cpsi (number of cells per 1 square inch) and diameter of 50 mm. The honeycomb structure was sintered in an air atmosphere of 1260 to 1320° C.

Figure 3A:
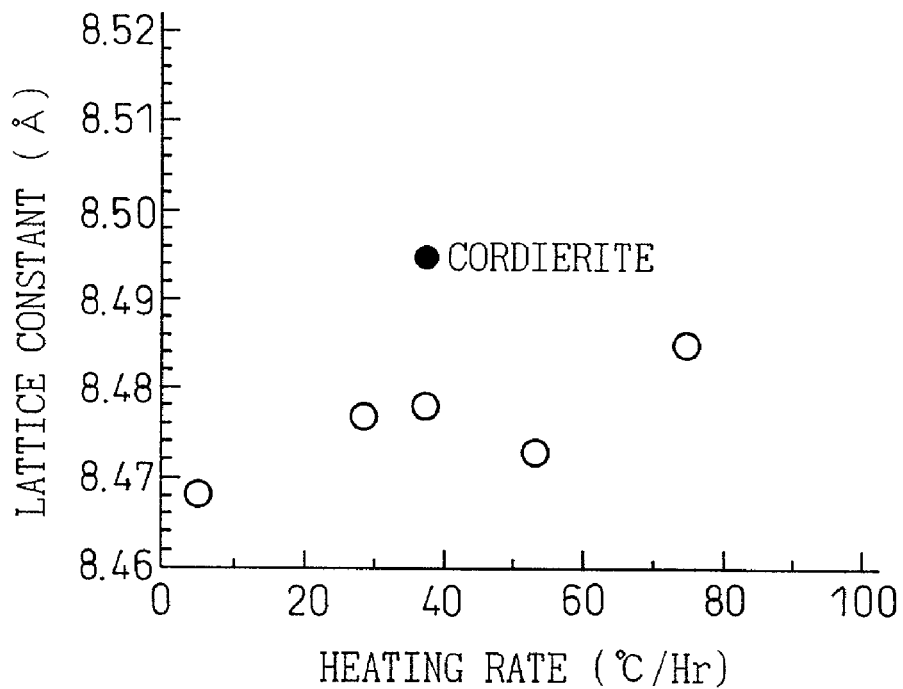
FIG. 3 (a) and FIG. 3 (b) show the lattice constant as a function of the heating rate, FIG. 3 (a) for the a axis and FIG. 3 (b) for the c axis.
Figure 3B:
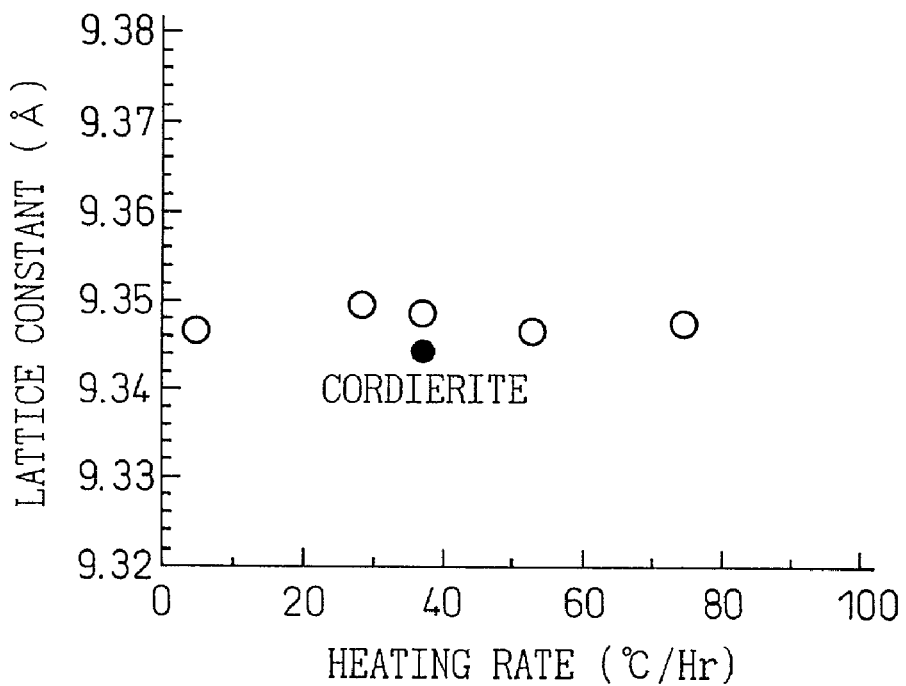
Figure 4A:
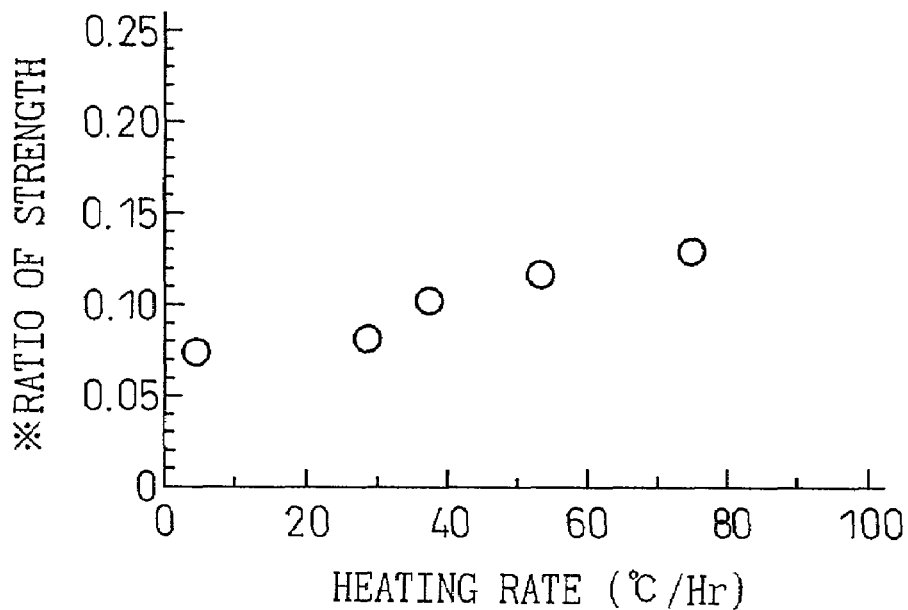
FIG. 4 (a) and FIG. 4 (b) show the content of phases other than cordierite as a function of the heating rate, FIG. 4 (a) for WO$_3$ and FIG. 4(b) for MgWO$_4$.
Figure 4B:
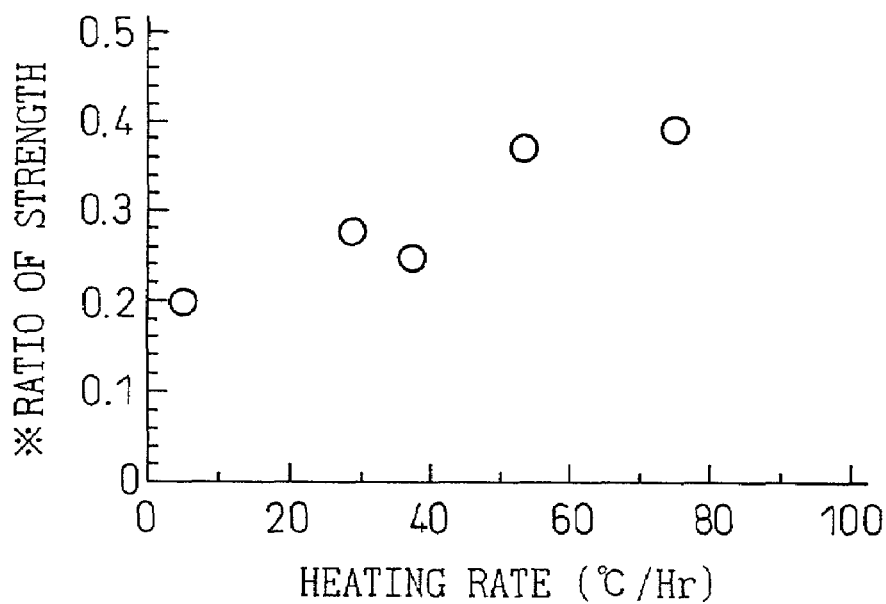

The structure of the ceramic body obtained by substituting 10% of Al with W as one example was examined by X-ray diffraction. The results are shown in FIG. 3 (a), FIG. 3 (b), FIG. 4 (a) and FIG. 4 (b). FIG. 3 (a) and FIG. 3 (b) show the results of the measurement of the lattice constant for the a axis and the lattice constant for the c axis, with respect to plural ceramic bodies obtained by varying the temperature rising rate during sintering. As shown in FIG. 3(a), the lattice constant for the a axis clearly changes to the cordierite phase (indicated by the symbol ● in the drawing) that is not substituted with elements. This shows that the structure of the cordierite phase varies as a result of the substitution of Al with W, and thus a solid solution exists. Also in other substituting elements, a change in lattice constant is observed and the existence of the solid solution was confirmed. Actually, peaks of $WO_3$ and $MgWO_4$ as phases other than cordierite were confirmed. A relationship between the content of phases other than cordierite ($WO_3$ and $MgWO_4$) and the heating rate is shown in FIG. 4 (a) and FIG. 4 (b). As shown in FIG. 4 (a) and FIG. 4 (b), since a correlation between the content of phases other than cordierite ($WO_3$ and $MgWO_4$) and the heating rate is recognized and also a correlation between the lattice constant for a axis and the heating rate is recognized as shown in FIG. 3 (a), lower heating rate (longer reaction time) leads to much W as the substituting element to be cordierite incorporated into cordierite crystals. It is theoretically possible to eliminate different phases, but is difficult to completely eliminate different phases in the actual production, and different phases may exist as far as the crystallinity and catalytic performance are not deteriorated.

As the catalyst component to be supported on the ceramic carrier, for example, noble metal elements such as Pt, Rh, Pd, Ir, Au, Ag and Ru are commonly used as a main catalyst and, if necessary, various promoters are added. Examples of the promoter include metal elements such as Hf, Ti, Cu, Ni, Fe, Co, W, Mn, Cr, V, Se, Rb, Sr, Y, Zr, Nb, Mo, Tc, Ru, Sc, Ba, K and lanthanoid elements (La, Ce, Pr, Nd, Pm, Sm, Eu, Gd, Tb, Dy, Ho, Er, Tm, Yb and Lu), and oxides or complex oxides thereof. According to the purposes such as suppression of deterioration, oxygen occluding ability and detection of catalyst deterioration, one or more kinds of these elements can be used.

Preferably, Pt, Rh, Pd and Ir are used as the main catalyst component, and at least one element selected from Y, Zr, La and Ce or oxides thereof is preferably used as the promoter component.

Figure 5:
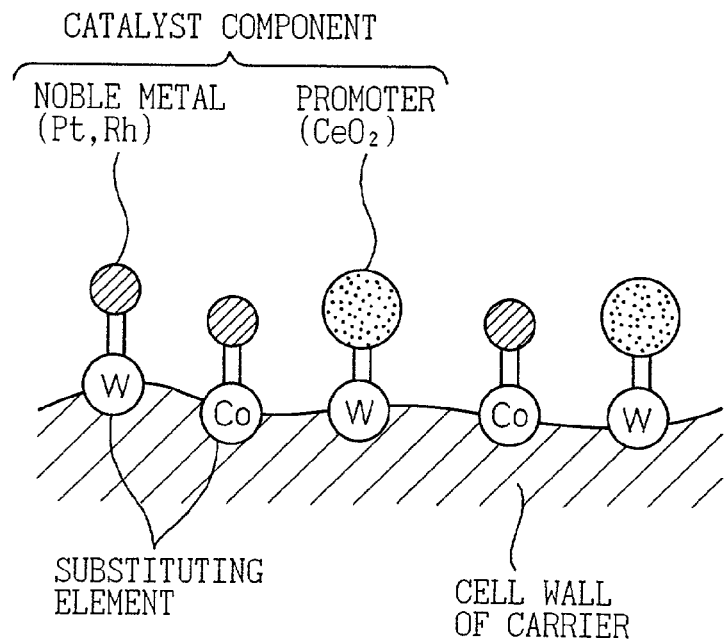
FIG. 5 is a partially enlarged view of the catalyst surface schematically showing the state of catalyst component supported on the ceramic body of the present invention.

These catalyst components are usually supported on the ceramic body of the present invention by immersing the ceramic body in a solution containing the desired catalyst components and sintering the immersed ceramic body. When using two or more catalyst components in combination, the ceramic body may be immersed in a solution containing plural catalyst components. As shown in FIG. 5. when using Pt and Rh as a main catalyst component, the ceramic body is immersed in a solution containing hexachloroplatinate and rhodium chloride, dried and then sintered in air atmosphere. Furthermore, the sintered ceramic body is immersed in a solution containing $CeO_2$ as a promoter component, dried and then sintered in air atmosphere, and thus the noble metal and the promoter as catalyst components are supported on substituting elements (Co, W) on the surface of the ceramic body by means of chemical bonding. For example, $CeO_2$ is used as the promoter component in a three way catalyst and a NOx catalyst. The quantity of the catalyst component supported is preferably in a range from 0.05 to 10 g/L for noble metal catalyst, and is preferably in a range from 10 to 250 g/L for promoter.

As described above, a ceramic catalyst body supported directly with a required quantity of the catalyst component can be obtained by using the ceramic body of the present invention without forming a coating layer made of γ-alumina. Since the resulting ceramic catalyst body is preferably used as an automobile exhaust gas purifying catalyst and requires no coating layer, it can reduce the heat capacity to activate the catalyst in an early stage and is effective to reduce the coefficient of heat expansion and pressure loss. In the ceramic catalyst body, the catalyst component is supported by means of chemical bonding, for example, by the fact that electron orbit thereof overlaps with that of substituting element. Therefore, bonding of the ceramic body with the catalyst component becomes firm as compared with the method of physically supporting on vacancies, thus resulting in high effect of suppresing thermal deterioration caused by agglomeration of catalyst components as a result of the movement due to thermal vibration.

Figure 6:
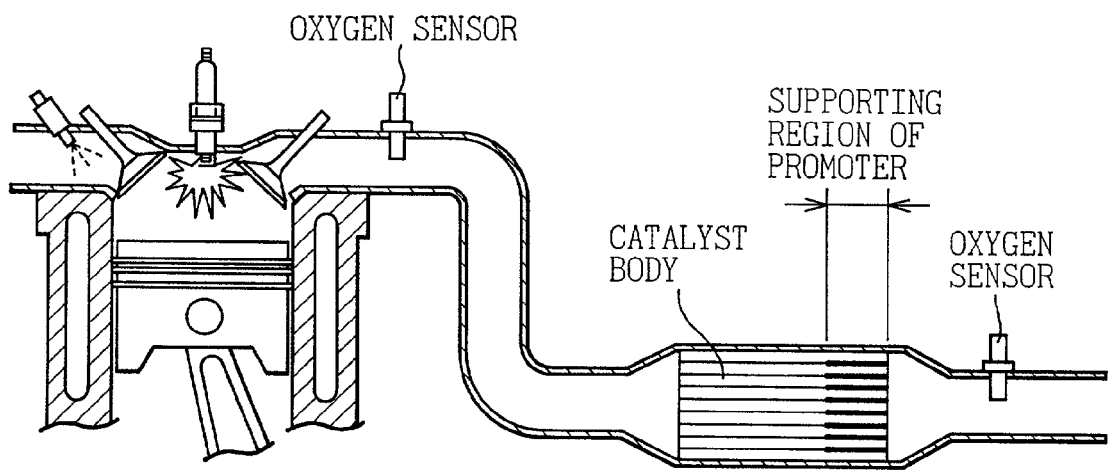
FIG. 6 shows the overall constitution of an automobile exhaust gas purification catalyst system as an application of the present invention.
Figure 7A:
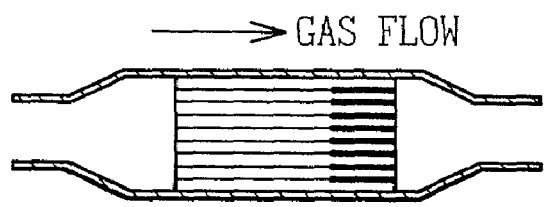
FIG. 7 (a) through FIG. 7 (e) show examples of catalyst supporting region when a promoter component is partially supported on the ceramic body of the present invention FIG. 8 (a) shows the purification performance as a function of the distance from the end face when a promoter component is partially supported, FIG. 8 (b) shows the purification performance as a function of the distance from the center, and FIG. 8 (c) shows the purification performance as a function of the amount of the promoter supported.
Figure 7B:
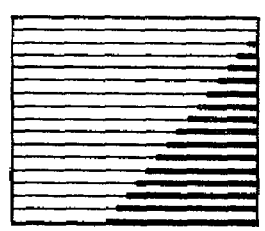
Figure 7C:
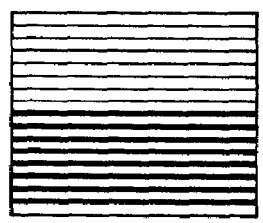
Figure 7D:
Figure 7E:
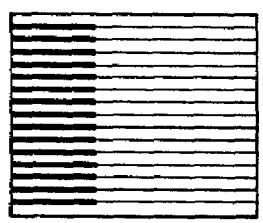

When using the promoter catalyst, the promoter can also be partially supported on the ceramic body. FIG. 6 shows the overall an automobile exhaust gas purification catalyst system as an application of the present invention, wherein a supporting region of the promoter is limited to a rear end in a gas flow direction of a ceramic body having a honeycomb structure. To activate the catalyst in an earlier stage, it is effective to reduce the quantity of the catalyst supported without supporting the promoter. In a conventional three way catalyst (γ-alumina coating), deterioration is detected by utilizing an oxygen occluding ability of the promoter and a deterioration detecting system is required when the promoter is lost. In such a case, only a main catalyst is supported in the upstream side closer to the engine where the temperature is liable to be raised to high temperature, thereby to promote early activation, while a promoter is supported on the rear end, thereby to allow it to detect deterioration by a conventional detecting method. With respect to detection of deterioration, using two oxygen sensors arranged at the front and rear of the catalyst, the case where a defined adsorption/desorption ability can not be maintained is judged as deterioration.

In the NOx catalyst, control delay is sometimes caused by the promoter having an oxygen occluding ability when NOx purge control is desired and accordingly no promoter tends to be used, while it can partially support the promoter as far as it exerts no influence on control, thereby improving the NOx purification performance. Examples of the promoter used in these purposes include Rb, Sr, Y, Zr, Nb, Mo, Tc, Ru, Sc and lanthanoid elements (La, Ce, Pr, Nd, Pm, Sm, Eu, Gd, Tb, Dy, Ho, Er, Tm, Yb and Lu), and oxides or complex oxides thereof. Among these promoters, oxides or complex oxides containing La, Ce, Nd, Zr, Y, Ba and Sr are preferably used.

Figure 8A:
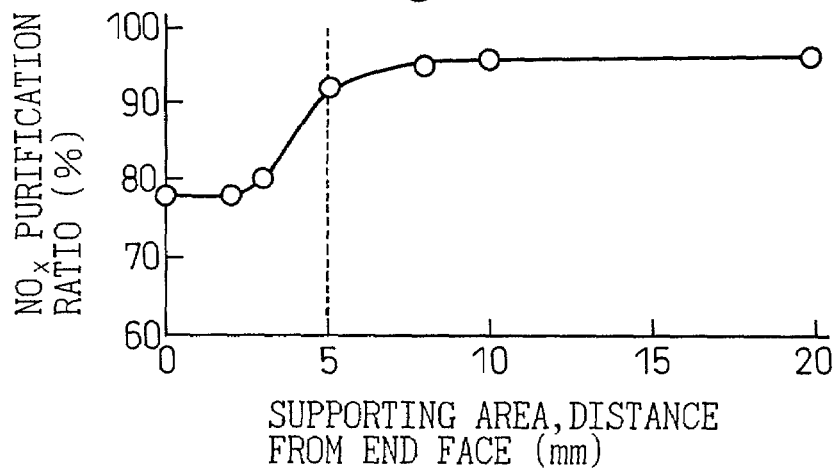
Figure 8B:
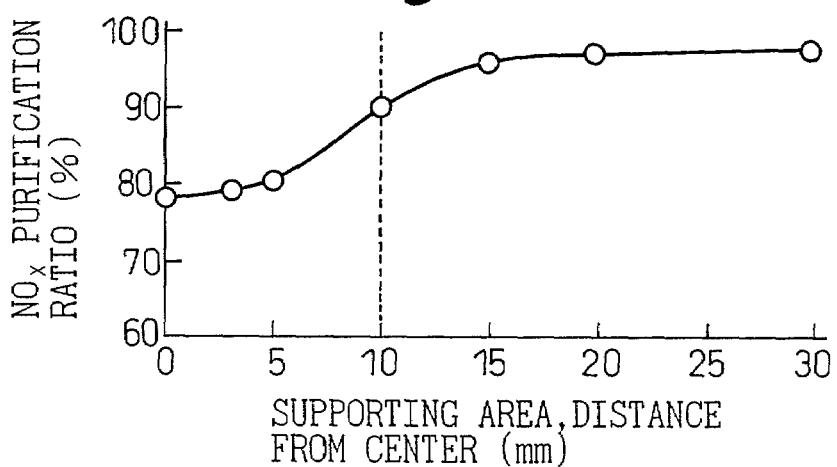
Figure 8C:
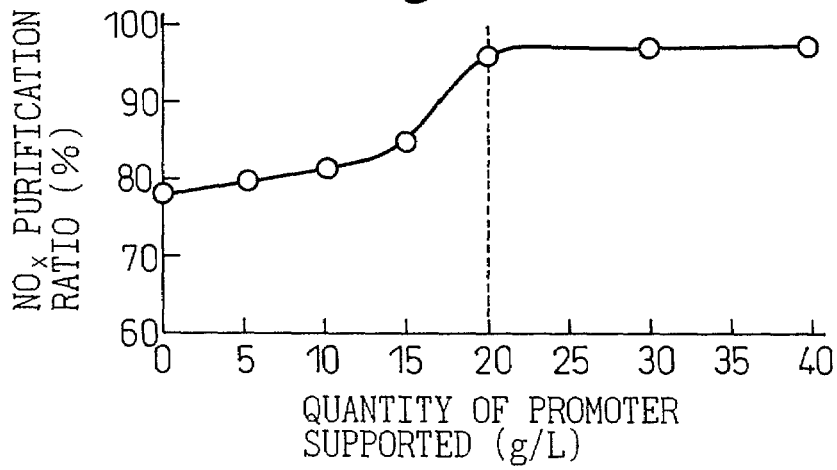
Figure 9A:
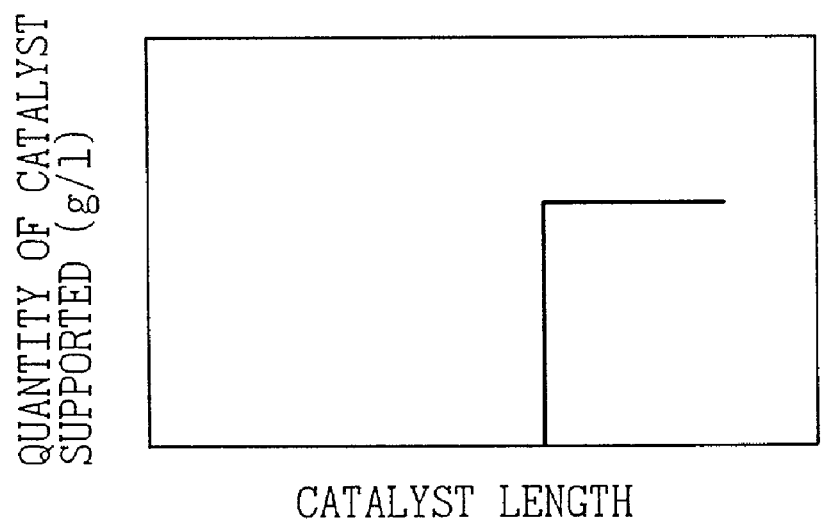
FIG. 9 (a) and FIG. 9 (b) show the quantity of the catalyst supported vs. the catalyst length.
Figure 9B:
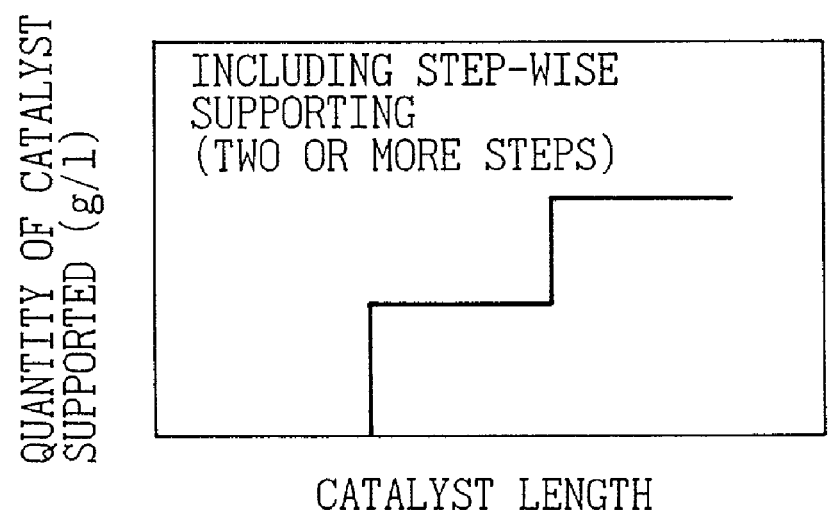

As shown in FIG. 7 (a), a NOx catalyst comprising a promoter supported on the rear end of a ceramic body was made and the supporting region of the promoter and the NOx purification ratio were examined. As shown in FIG. 8 (a) and FIG. 8 (b), when the promoter is supported in the region where the distance from the rear end is not lower than 5 mm and the distance from the center is not lower than 10 mm, the effect of improving the catalyst performance (NOx purification performance) can be obtained. As is apparent from FIG. 8 (c), the quantity of the promoter supported in the supporting region is preferably 20 g/l or higher. The supporting region of the promoter is not limited to the rear end, and can vary according to the purposes and requisite performances, as shown in FIG. 7 (b) to FIG. 7 (e). The quantity of the promoter supported in the supporting region can be enhanced stepwise as shown in FIG. 9 (b) without being controlled to a given quantity as shown in FIG. 9 (a).

Figure 10A:
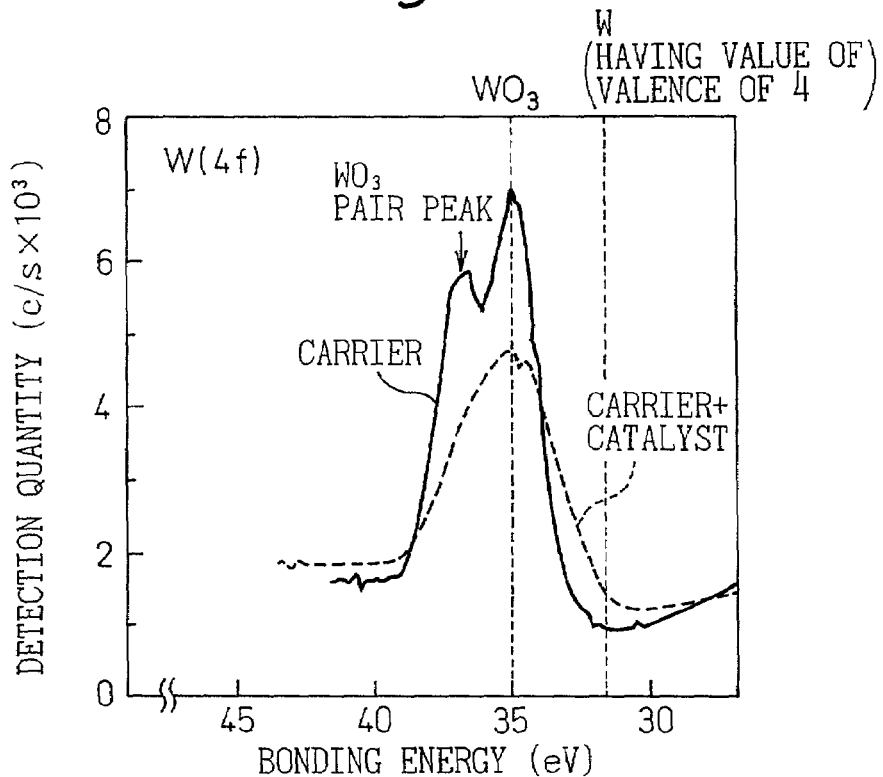
FIG. 10 (a) shows the change in bonding energy of the substituting element when the catalyst component is partially supported on the ceramic body, and FIG. 10 (b) is a partially enlarged view of FIG. 10 (a).
Figure 10B:
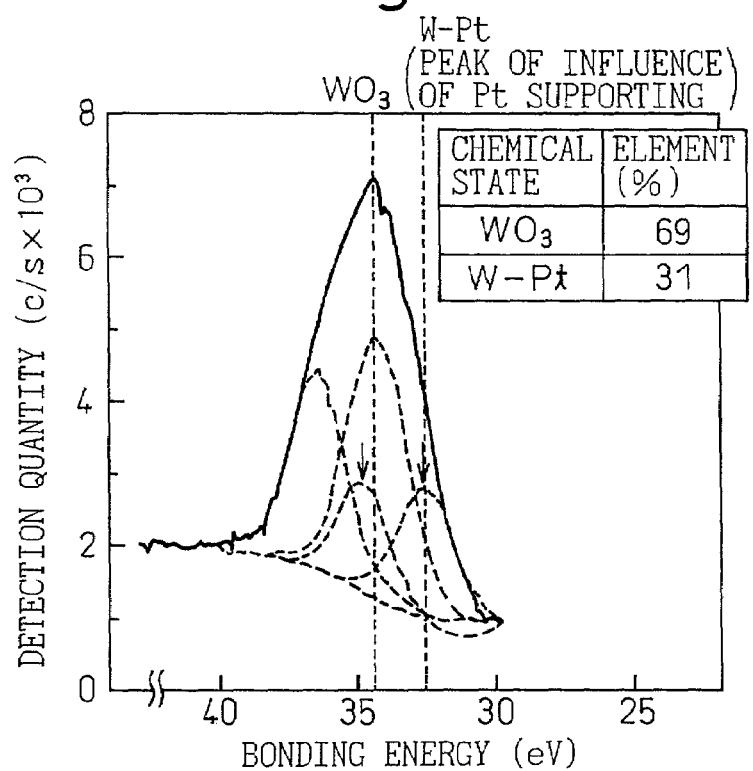

FIG. 10 (a) and FIG. 10 (b) show the results obtained by measuring a change in bonding energy of W before and after supporting Pt when Pt as a catalyst component is supported on a ceramic body wherein a portion of Al is substituted with W. As shown in FIG. 10 (a), a peak of W becomes broad by supporting the catalyst component and a portion of the bonding energy of W is partially shifted (from 34.6 eV to 32.7 ev). As shown in FIG. 10 (b), which is an enlarged view, plural peaks (arrows in the graph) that seem to be generated by an influence of supporting Pt, in addition to the peak of W. At this time, the peak of $WO_3$-based ceramic body was 69% and the peak generated by the influence of supporting of Pt was 31%. As described above, the bonding energy of W varies with supporting of Pt and the existence of a bond sharing free electrons between substituted W and Pt was confirmed. A change in value of valence was not observed in constituent elements (Si, Al, Mg, O) of the other ceramic body.

In the same manner, a lot of ceramic catalyst bodies were made, by supporting Pt as a catalyst component on ceramic bodies, wherein a portion of Al is substituted with W, and then the quantity of Pt supported on each ceramic catalyst body was measured by EPMA. An average value was calculated from 20 measuring points per one ceramic catalyst body. As a result, the quantity of Pt supported (average value) was 1.5 g/L. It was found that the catalyst supporting performance is markedly improved as compared with the ceramic body made of cordierite which is not substituted with elements (quantity of Pt supported: 0.02 g/L).

This shows that the bonding strength between the catalyst component and the ceramic body was enhanced by the substitution with the element using W. FIG. 11 shows the chemical bonding strength of the substituting element and Pt as the catalyst component in comparison to a case without substitution (Al) when Al as the constituent element of cordierite is substituted with various substituting elements (W, Ti, Ge, Mn, Zr, Pt, Mo). The ordinate indicates a change (maximum value) in chemical bonding strength due to supporting of Pt calculated by a first principle theory calculation and it is found that the bonding force between the substituting element and the catalyst component is enhanced by the bonding strength between the constituent element (Al) to be substituted and the catalyst component.

When the constituent element of the substrate ceramic is substituted, for example, Si (+4), Al (+3) and Mg (+2) as constituent elements of cordierite are substituted with the substituting element that has different values of valence, poor or excess electric charges, that correspond to the difference in value of valence and substitution quantity of elements to be substituted, are generated to cause lattice defects or oxygen defects in order to maintain electrical neutrality for crystal lattice. When the catalyst component is supported on the ceramic body having these defects by the method described above, not only the catalyst component is supported by bonding with the substituting element, but also the catalyst component is supported in pores formed by these defects. Since the bonding strength between the defects and the catalyst component is far smaller than the chemical bonding strength of the substituting element, when used at a high temperature for a long period, the catalyst component bonded to the defects is likely to move and agglomerate, thereby causing thermal deterioration.

To avoid such thermal deterioration, in case of selecting the substituting element, the constituent element and the substituting element are preferably selected so that the sum of oxidation numbers of the constituent element to be substituted is equal to the sum of oxidation numbers of the substituting element. For example, when two Si(s) (+4) as the constituent element of cordierite are substituted with each one of W (+6) and Co (+2) that have different values of valence, thereby to cause no change in value of valence, defects are not formed. Examples of the hexavalent element, with which Si can be substituted, include Mo, Cr, Se and Te, in addition to W. Examples of the divalent element include Ni, Cu, Fe, Mn and Cr, in addition to Co. Therefore, using at least one of these hexavalent elements and at least one of these divalent elements, the total number of atoms of substituting elements is made to be equal to the number of atoms of constituent element (Si) to be substituted, while the hexavalent element and the divalent element are included in proportion of 1:1 in the ratio of the number of atoms.

The occurrence of defects can also be suppressed by using the substituting element having the same value of valence as that of the constituent element. For example, when two Si(s) (+4) are substituted with one Ce (+4) and one Zr (+4), that have the same value of valence, since the value of valence does not vary, defects are not formed. As for combination of elements having different values of valence, two Si(s) (+4) can also be substituted with each one of V (+5) and Cr (+3). In addition, three Si(s) (+4) can be substituted with three kinds of elements including elements having the same or different values of valence, for example, three kinds of each one of W (+6), Fe (+3) and Cr (+3). Alternatively, four Si(s) (4) can also be substituted with four kinds of elements including elements having the same or different values of valence. In any case, substituting elements are selected so that the sum of oxidation numbers of the constituent element to be substituted is equal to the sum of oxidation numbers of the substituting element and that the number of atoms of the element to be substituted is equal to those of the substituting element. Combination of number of atoms substituted with Si (having value of valence of +4) and value of valence of the substituting element is shown in Table 1, and element species and value of valence thereof are shown in Table 4.

Table 2 and Table 3 show an example of combination of the number of atoms to be supported and the value of valence of the substituting element when constituent elements to be substituted are Al and Mg. Similarly, when the constituent element is trivalent Al, a tetravalent element, for example, at least one of Ti, Mn, V, Ge, Zr and Ce and a divalent element, for example, at least one of Co, Ni, Cu, Fe, Mn and Cr can be selected. The total number of atoms of the first element and the second element is made to be equal to the number of atoms of the constituent element (Si) to be substituted, while the tetravalent element and the divalent element are included in proportion of 1:1 in the ratio of the number of atoms. When the constituent element to be substituted is divalent Mg, for example, a combination of the trivalent element and the monovalent element may be used as the substituting element. Also in the case where the number of atoms to be substituted is 3 or more, various combinations shown in Table 2 and Table 3 can be employed.

As described above, the occurrence of defects can be suppressed by using substituting elements, that have the same as or different from that of the constituent element, in combination. It is theoretically possible to eliminate defects, but is difficult to completely eliminate defects in the actual production, and defects may exist as far as the crystallinity and catalytic performance are not deteriorated.

TABLE 1

Combination of number of atoms substituted with Si (having value of valence of +4) and value of valence

| Number of atoms to be substituted | 2 (+8) | 3 (+12) | 4 (+16) | |
|---|---|---|---|---|
| Combination of value of valence | 6, 2 | 7, 4, 1 | 7, 7, 1, 1 | 6, 5, 4, 1 |
|  | 5, 3 | 7, 3, 2 | 7, 6, 2, 1 | 6, 5, 3, 2 |
|  | 4, 4 | 6, 5, 1 | 7, 5, 3, 1 | 6, 4, 3, 3 |
|  |  | 6, 4, 2 | 7, 5, 2, 2 | 6, 4, 4, 2 |
|  |  | 6, 3, 3 | 7, 4, 4, 1 | 5, 5, 5, 1 |
|  |  | 5, 4, 3 | 7, 4, 3, 2 | 5, 5, 4, 2 |
|  |  | 4, 4, 4 | 7, 3, 3, 3 | 5, 5, 3, 3 |
|  |  | 5, 5, 2 | 6, 6, 3, 1 | 5, 4, 4, 3 |
|  |  |  | 6, 6, 2, 2 | 4, 4, 4, 4 |

TABLE 2

Combination of number of atoms substituted with Al (having value of valence of +3) and value of valence

| Number of atoms to be substituted | 2 (+6) | 3 (+9) | 4 (+12) | |
|---|---|---|---|---|
| Combination of value of valence | 5, 1 | 7, 1, 1 | 7, 3, 1, 1 | 5, 3, 2, 2 |
|  | 4, 2 | 6, 2, 1 | 7, 2, 2, 1 | 5, 3, 3, 1 |
|  | 3, 3 | 5, 3, 1 | 6, 4, 1, 1 | 4, 4, 3, 1 |
|  |  | 5, 2, 2 | 6, 3, 2, 1 | 4, 3, 3, 2 |
|  |  | 4, 4, 1 | 6, 2, 2, 2 | 3, 3, 3, 3 |
|  |  | 4, 3, 2 | 5, 5, 1, 1 |  |
|  |  | 3, 3, 3 | 5, 4, 2, 1 |  |

TABLE 3

Combination of number of atoms substituted with Mg (having value of valence of +2) and valence

| Number of atoms to be substituted | 2 (+4) | 3 (+6) | 4 (+8) |
|---|---|---|---|
| Combination of value of valence | 3, 1 | 4, 1, 1 | 5, 1, 1, 1 |
|  | 2, 2 | 3, 2, 1 | 4, 2, 1, 1 |
|  |  | 2, 2, 2 | 3, 3, 1, 1 |
|  |  |  | 2, 2, 2, 2 |

TABLE 4

Element species and value of valence thereof

| Elements | Value of valence | Elements | Value of valence |
|---|---|---|---|
| Cr | 2, 3, 6 | Ce | 3, 4 |
| Mn | 2, 3, 4, 7 | Ir | 3, 4 |
| Fe | 2, 3 | Ga | 3 |
| Co | 2, 3 | Au | 3 |
| Ni | 2, 3 | Ti | 3, 4 |
| Ru | 2, 3, 4 | Zr | 4 |
| Pt | 2, 4 | Ge | 4 |
| Cu | 1, 2 | W | 4, 6 |
| Pd | 2, 4 | Mo | 6 |
| V | 3, 4, 5 | Se | 4, 6 |
| Rh | 1, 2, 3 | Ag | 1 |

With respect to permissible number of defects when substituted with the element having the value of valence that is different from that of the constituent element, when Al of cordierite is substituted, the number of defects formed by the substitution is not larger than 2 per formula weight (2 $MgO \cdot 2Al_2O_3 \cdot 5SiO_2$), preferably. The reason is as follows. That is, the number of trivalent Al (s) is 4 per formula weight (2 $MgO \cdot 2Al_2O_3 \cdot 5SiO_2$) and, when trivalent Al(s) are substituted with two hexavalent W(s), two defects are formed and Al is lost. Therefore, strain of the cordierite crystal increases, resulting in poor stability. Since the number of atoms per formula is 29, the proportion of lattice defects is preferably about 7% based on atoms.

When substituting constituent elements of the substrate ceramic, the substitution would be possible when ratio of the effective ionic diameter of the constituent element to be substituted to that of the substituting element is in a range from 0.7 to 2.0. Table 5 shows the ratio of the ionic diameter of the constituent element to be substituted to that of the substituting element, and the possible sites of substitution predicted therefrom.

TABLE 5

| Symbol of element | Electron configuration | Ionic diameter (Å) | Ratio of ionic diameter to Si | Ratio of ionic diameter to Al | Ratio of ionic diameter to Mg | Possible substitution site |
|---|---|---|---|---|---|---|
| Mg | [Ne]3s2 | 0.65 |  |  |  |  |
| Al | [Ne]3s2 3p1 | 0.49 |  |  |  |  |
|  |  | 0.52 |  |  |  |  |
| Si | [Ne]3s2 3p2 | 0.4 |  |  |  |  |
|  |  | 0.54 |  |  |  |  |
| Ti | [Ar]3d2 4s2 | 0.68 | 1.3 | 1.3 | 1.0 | Mg, Al, Si |
| V | [Ar]3d3 4s2 | 0.56 | 1.4 | 1.1 |  | Al, Si |
|  |  | 0.59 | 1.1 | 1.1 | 0.9 | Mg, Al, Si |
| Cr | [Ar]3d5 4s1 | 0.49 | 1.2 | 1.0 |  | Al, Si |
|  |  | 0.66 | 1.7 | 1.3 |  | Al, Si |
|  |  | 0.69 | 1.3 | 1.3 | 1.1 | Mg, Al, Si |

TABLE 5-continued

| Symbol of element | Electron configuration | Ionic diameter (Å) | Ratio of ionic diameter to Si | Ratio of ionic diameter to Al | Ratio of ionic diameter to Mg | Possible substitution site |
|---|---|---|---|---|---|---|
| Mn | [Ar]3d5 4s2 | 0.57 | 1.4 | 1.2 |  | Al, Si |
|  |  | 0.6 | 1.1 | 1.2 | 0.9 | Mg, Al, Si |
|  |  | 0.7 | 1.3 | 1.3 | 1.1 | Mg, Al, Si |
|  |  | 0.8 | 1.5 | 1.5 | 1.2 | Mg, Al, Si |
| Fe | [Ar]3d6 4s2 | 0.61 | 1.5 | 1.2 |  | Al, Si |
|  |  | 0.7 | 1.8 | 1.4 |  | Al, Si |
|  |  | 0.64 | 1.2 | 1.2 | 1.0 | Mg, Al, Si |
|  |  | 0.74 | 1.4 | 1.4 | 1.1 | Mg, Al, Si |
| Co | [Ar]3d7 4s2 | 0.6 | 1.5 | 1.2 |  | Al, Si |
|  |  | 0.68 | 1.7 | 1.4 |  | Al, Si |
|  |  | 0.63 | 1.2 | 1.2 | 1.0 | Mg, Al, Si |
|  |  | 0.72 | 1.3 | 1.4 | 1.1 | Mg, Al, Si |
| Ni | [Ar]3d8 4s2 | 0.57 | 1.4 | 1.2 |  | Al, Si |
|  |  | 0.66 | 1.7 | 1.3 |  | Al, Si |
|  |  | 0.6 | 1.1 | 1.2 | 0.9 | Mg, Al, Si |
|  |  | 0.69 | 1.3 | 1.3 | 1.1 | Mg, Al, Si |
| Ga | [Ar]3d10 4s2 4p1 | 0.59 | 1.5 | 1.2 |  | Al, Si |
|  |  | 0.62 | 1.1 | 1.2 | 1.0 | Mg, Al, Si |
| Ge | [Ar]3d10 4s2 4p2 | 0.5 | 1.3 | 1.0 |  | Al, Si |
|  |  | 0.53 | 1.0 | 1.0 | 0.8 | Mg, Al, Si |
| Zr | [Kr]4d2 5s2 | 0.79 | 1.5 | 1.5 | 1.2 | Mg, Al, Si |
| Mo | [Kr]4d5 5s1 | 0.62 | 1.1 | 1.2 | 1.0 | Mg, Al, Si |
| Ru | [Kr]4d7 5s1 | 0.72 | 1.3 | 1.4 | 1.1 | Mg, Al, Si |
| W | [Xe]4f14 5d4 6s2 | 0.62 | 1.1 | 1.2 | 1.0 | Mg, Al, Si |

Possible combinations of the sites of substitution with two kinds of substituting elements are Si+Si site, Si+Al site, Si+Mg site, Al+Al site, Al+Mg site and Mg+Mg site. Among these, substitution is considered to actually take place at such sites that both elements have similar values of valence and ion diameters. Most probable site of substitution can be predicted by simulation. In the simulation, for example, the most probable crystal structure is determined by the density functional formality with various elements at the possible sites being substituted, and the total energy is compared between crystal structures of various states after substitution, thereby to estimate the possibility of solid solution. Strength of bonding with the catalyst can be estimated from the most probable crystal structure thus determined. The method of density functional formality is based on the fact that the total energy of a system at the ground state can be represented by the density functional of electrons, and determines the electron state in a crystal by applying a Hamilton function, that represents the mutual interaction between electrons, to the wave equation. This method is suited to the prediction of electron state in the interface between the surface of a support made of an oxide or other material and the catalyst component.

Figure 12A:
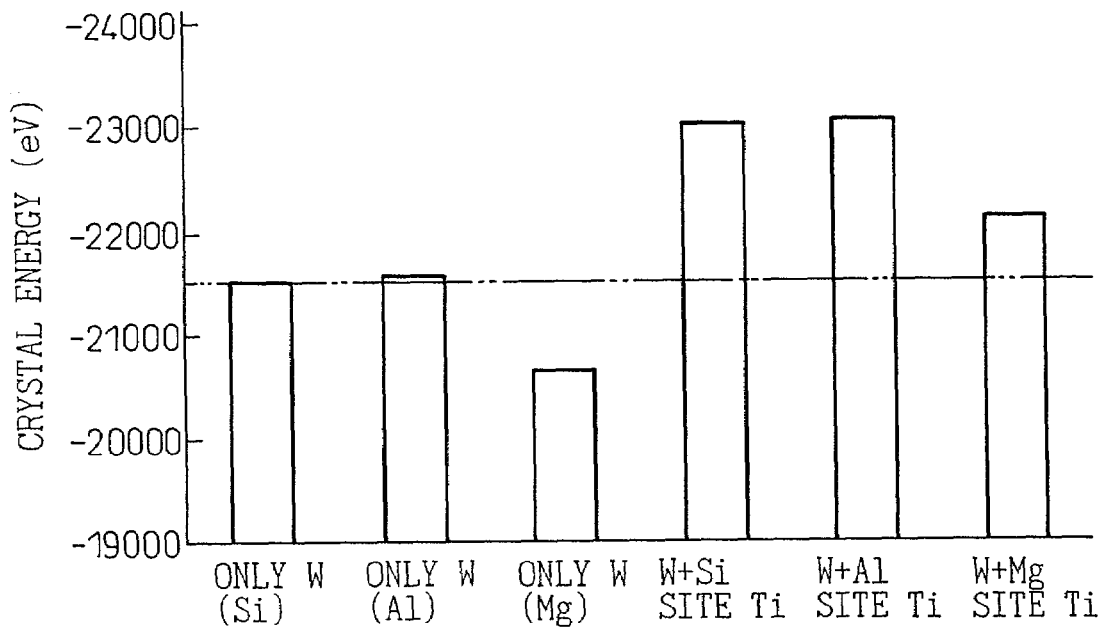
FIG. 12 (a) shows the crystallization energy as a function of the solid solution site of the substituting element, and FIG. 12 (b) shows the model simulated by the density functional method.
Figure 12B:
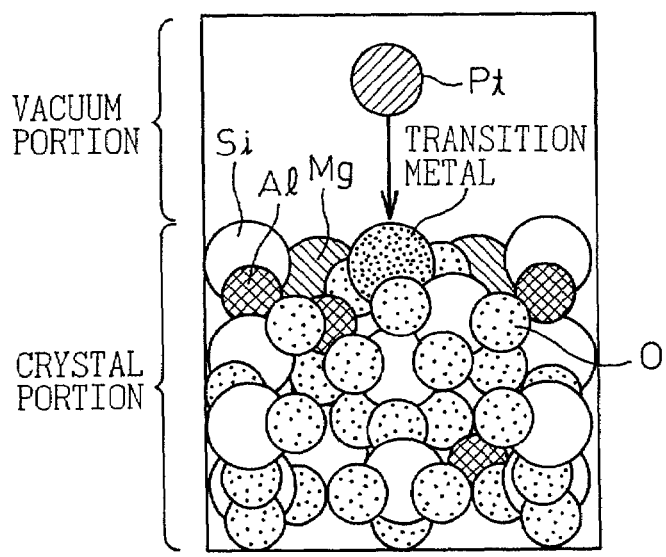

FIG. 12 (a) shows the crystal energy for various sites of solid solution with Ti, in comparison of a case of using W and Ti as the substituting elements and a case of using w only (Si and Al, Mg site). The simulation by the method of density functional formality was carried out on the model shown in FIG. 12 (b) under the following conditions of hardware and software.

| Pre/post: | Cerius 2 |
| Analyzer: | CASTEP |
| W/S: | SGI Octane 2 |
| Cpu time: | Approx. 70,000 seconds |

Strength of bonding between the noble metal catalyst (Pt) and the substituting element was estimated as shown in Table 6.

TABLE 6

|  | Bonding strength with Pt (eV) |
|---|---|
| W + Si site Ti | 15.1 |
| W + Al site Ti | 13.8 |
| W + Mg site Ti | 10.3 |
| W + Si site Fe | 17.4 |
| W + Al site Fe | 10.2 |
| W + Mg site Fe | 5.4 |
| W + Si site Co | 16.4 |
| W + Al site Co | 16.7 |
| W + Mg site Co | 6.2 |

Based on the simulation described above, it is found that it is highly probable that W substitutes at the Si and Al site and other substituting elements such as Ti substitute at the site of Al or Si.

What is claimed is:

1. A ceramic body having a ceramic substrate containing cordierite as a main component, wherein one or more constituent elements of the ceramic substrate are substituted with an element other than the constituent elements, and a catalyst component is directly supported on and chemically bonded to the substituting element
wherein said constituent element to be substituted is at least one element selected from the group consisting of Si, Al and Mg and wherein a ratio of an effective ion diameter of said constituent element to be substituted to that of said substituting element is in a range from 0.7 to 2.0.

2. The ceramic body according to claim 1, wherein said ceramic substrate contains cordierite in a concentration not lower than 1 vol %.

3. The ceramic body according to claim 2, wherein said ceramic substrate contains cordierite in a concentration not lower than 5 vol %.

4. The ceramic body according to claim 1, wherein said substituting element is one or more element having d or f orbit in the electron orbits thereof.

5. The ceramic body according to claim 4, wherein said substituting element has an empty orbit in the d or f orbit thereof.

6. The ceramic body according to claim 5, wherein said substituting element is at least one element selected from the group consisting of Ti, V, Cr, Mn, Fe, Co, Ni, Zr, Mo, Ru, Rh, Ce, W, Jr and Pt.

7. The ceramic body according to claim 1, wherein said substituting element is at least one element that has two or more oxidation states.

8. The ceramic body according to claim 7, wherein said substituting element is at least one element selected from the group consisting of Cu, Ga, Ge, Se, Pd, Ag and Au.

9. The ceramic body according to claim 1, wherein a proportion of a solid solution of said substituting element is not lower than 5 ppb of the number of atoms of said constituent element to be substituted.

10. The ceramic body according to claim 1, wherein a proportion of a solid solution of said substituting element is not lower than 5 ppm of the number of atoms of said constituent element to be substituted.

11. The ceramic body according to claim 1, wherein a proportion of a solid solution of said substituting element is in a range from 0.01% to 50% of the number of atoms of said constituent element to be substituted.

12. The ceramic body according to claim 11, wherein a proportion of the solid solution is in a range from 2 to 7% of the number of atoms of the constituent element to be substituted in the ceramic substrate.

13. The ceramic body according to claim 1, wherein said catalyst component contains at least one element selected from the group consisting of Pt, Rh, Pd, Ir, Au, Ag, Ru, Hf, Ti, Cu, Ni, Fe, Co, W, Mn, Cr, V, Se, Rb, Sr, Y, Zr, Nb, Mo, Tc, Ru, Sc, Ba, K and lanthanoid elements as a main catalyst or a promoter component.

14. The ceramic body according to claim 1, wherein said catalyst component contains Pt, Rh, Pd and fr as a main catalyst and one or more elements selected from Y, Zr, La and Ce or oxides thereof as a promoter.

15. The ceramic body according to claim 1, wherein said catalyst component has an electron orbit that overlaps with that of said substituting element.

16. The ceramic body according to claim 1, wherein said catalyst component is supported by means of ion bonding with said substituting element.

17. The ceramic body according to claim 1, wherein said constituent elements and said substituting element are selected so that the sum of oxidation numbers of said constituent element to be substituted is equal to the sum of oxidation numbers of said substituting element.

18. The ceramic body according to claim 17, wherein one of said constituent elements is substituted with said substituting element that has the same value of valence as that of the constituent element.

19. The ceramic body according to claim 17, wherein one of said constituent elements is substituted with a plurality of said substituting elements that have different values of valence from that of the constituent element.

20. The ceramic body according to claim 18, wherein said constituent element is Si, Al or Mg, and said constituent element is substituted with two of said substituting elements, with the two elements being included in a proportion of 1:1 in the ratio of the number of atoms, and the total number of atoms of the two elements being equal to the number of atoms of said constituent elements to be substituted.

21. The ceramic body according to claim 20, wherein both the constituent elements to be substituted with the substituting elements are located at the Si site.

22. The ceramic body according to claim 20, wherein one of the constituent elements to be substituted with the two substituting elements is located at the Si site and the other is located at the Al site.

23. The ceramic body according to claim 20, wherein one of the constituent elements to be substituted with the two substituting elements is located at the Si site and the other is located at the Mg site.

24. The ceramic body according to claim 20, wherein both the constituent elements to be substituted with the two substituting elements are located at the Al site.

25. The ceramic body according to claim 20, wherein one of the constituent elements to be substituted with the two substituting elements is located at the Al site and the other is located at the Mg site.

26. The ceramic body according to claim 20, wherein both the constituent elements to be substituted with the two substituting elements are located at the Mg site.

27. The ceramic body according to claim 19, wherein said constituent element is Si, Al or Mg, while said constituent element is substituted with three substituting elements, two of the three elements having the same value of valence, with the two elements that have the same value of valence and the other element being included in the proportion of 2:1 in the ratio of the number of atoms, and the total number of atoms of the three elements being equal to the number of atoms of the constituent elements to be substituted.

28. The ceramic body according to claim 19, wherein said constituent element is Si, Al or Mg, while said constituent element is substituted with three substituting elements, while the three elements having different values of valence, with the three elements being included in the proportion of 1:1:1 in the ratio of the number of atoms, and the total number of atoms of the three elements being equal to the number of atoms of said constituent elements to be substituted.

29. The ceramic body according to claim 17, wherein said constituent element is Si, Al or Mg, while said constituent element is substituted with three substituting elements, with at least one of the three elements having the same value of valence as that of said constituent element, the three elements being included in the proportion of 1:1:1 in the ratio of the number of atoms, and the total number of atoms of the three elements being equal to the number of atoms of said constituent elements to be substituted.

30. The ceramic body according to claim 19, wherein said constituent element is Si, Al or Mg, while said constituent element is substituted with four substituting elements, while two of the four elements have the same value of valence and the other two elements have the same value of valence, with the pairs each comprising the two elements that have the same value of valence being included in the proportion of 1:1 in the ratio of the number of atoms, and the total number of atoms of the four elements being equal to the number of atoms of said constituent elements to be substituted.

31. The ceramic body according to claim 19, wherein said constituent element is Si, Al or Mg, while said constituent element is substituted with four substituting elements, with two of the four elements having the same value of valence, the two elements that have the same value of valence and the remaining two elements being included in the proportion of 2:1:1 in the ratio of the number of atoms, and the total number of atoms of the four elements being equal to the number of atoms of said constituent elements to be substituted.

32. The ceramic body according to claim 17, wherein said constituent element is Si, Al or Mg, while said constituent element is substituted with four substituting elements, with two of the four elements having the same value of valence as that of said constituent elements, the two elements that have the same value of valence and the remaining two elements being included in the proportion of 2:1:1 in the ratio of the number of atoms, and the total number of atoms of the four elements being equal to the number of atoms of said constituent elements to be substituted.

33. The ceramic body according to claim 19, wherein said constituent element is Si, Al or Mg, while said constituent element is substituted with four substituting elements, with three of the four elements having the same value of valence, with the three elements that have the same value of valence and the remaining element being included in the proportion of 3:1 in the ratio of the number of atoms, and the total number of atoms of the four elements being equal to the number of atoms of said constituent elements to be substituted.

34. The ceramic body according to claim 19, wherein said constituent element is Si, Al or Mg, while said constituent element is substituted with four substituting elements, with the four of said elements being included in the proportion of 1:1:1:1 in the ratio of the number of atoms, and the total number of atoms of the four elements being equal to the number of atoms of said constituent elements to be substituted.

35. The ceramic body according to claim 17, wherein said constituent element is Si, Al or Mg, while said constituent element is substituted with four of said substituting elements, with at least one of the four elements having the same value of valence as that of said constituent element, the four elements being included in the proportion of 1:1:1:1 in the ratio of the number of atoms, and the total number of atoms of the four elements being equal to the number of atoms of said constituent elements to be substituted.

36. The ceramic body according to claim 1, wherein said ceramic substrate is cordierite, while the number of lattice defects formed by substituting the constituent element with said substituting element having a different electric charge is not larger than 2 per formula weight ($2MgO.2Al_2O_3.5SiO2$).

37. The ceramic body according to claim 1, that is formed as a honeycomb, foam, hollow fiber, fiber, powder or as pellets.

38. A ceramic catalyst body comprising said ceramic body of claim 1 that supports said catalyst component thereon.

39. The ceramic catalyst body according to claim 38, wherein said catalyst component contains a main catalyst and a promoter component, while said promoter component is partially supported on a part of said ceramic body.

40. The ceramic catalyst body according to claim 39, wherein 20 g/L or more of the promoter component is supported in the portion of the ceramic body supporting said promoter component.

41. The ceramic catalyst body according to claim 38, wherein a wash coating material is partially supported on a part of said ceramic body.

* * * * *